United States Patent [19]

Pang et al.

[11] Patent Number: 4,583,168

[45] Date of Patent: Apr. 15, 1986

[54] READ ONLY MEMORY AND DECODE CIRCUIT

[75] Inventors: Richard Pang, Sunnyvale; Hemraj K. Hingarh, San Jose, both of Calif.

[73] Assignee: Fairchild Semiconductor Corporation, Cupertino, Calif.

[21] Appl. No.: 530,996

[22] Filed: Sep. 12, 1983

[51] Int. Cl.[4] ............................................. G06F 12/00
[52] U.S. Cl. ..................................... 364/200; 365/94; 307/463
[58] Field of Search ....................................... 307/463; 364/200 MS File, 900 MS File; 365/94

[56] References Cited
U.S. PATENT DOCUMENTS

| | | | |
|---|---|---|---|
| 4,401,903 | 8/1983 | Iizuka | 307/463 X |
| 4,434,465 | 2/1984 | McDonough et al. | 364/200 |
| 4,479,126 | 10/1984 | Higuchi et al. | 307/463 X |

Primary Examiner—Raulfe B. Zache
Attorney, Agent, or Firm—Willis E. Higgins; Carl L. Silverman; Clifton L. Anderson

[57] ABSTRACT

A microprocessor integrated circuit (50) has a read only memory (ROM) (400) which is X and Y addressible and is word, bit and page oriented. The microprocessor integrated circuit (50) has a main injector bus (602) and a ground return bus (604) with a branch ground bus (608) connected to the ground return bus (604) through a ground-balancing resistor (610) in a data path. The circuit (50) has a register file (82) with registers (622) connected to a local bus (604). The local busses (604) are connected to a main bus (602) through a multiplexer (605). The microprocessor integrated circuit (50) includes a D-type flip-flop circuit (700) with asynchronous clear and preset. A latch dual port random access memory (RAM) circuit (900) is employed in the register file (82) of the microprocessor integrated circuit (50).

6 Claims, 23 Drawing Figures

| TRUTH TABLE | |
|---|---|
| INPUT | OUTPUT |
| $et_n$ | $et_{n+1}$ |
| D | Q |
| H | H |
| L | L |

H = HIGH VOLTAGE LEVEL
L = LOW VOLTAGE LEVEL
$t_n$ = BIT TIME BEFORE CLOCK PULSE
$t_{n+1}$ = BIT TIME AFTER CLOCK PULSE

DELAY: ($V_m$ = 0.5V)
$t_w$ = 25 ns
$t_s$ = 5 ns
$t_h$ = 0 ns
$t_{PHL}$ = $t_{PLH}$ (CLK TO Q OR $\bar{Q}$) = 8 ns
$t_{PHL}$ = $t_{PLH}$ (CLEAR TO Q OR $\bar{Q}$) = 8 ns POWER: 12.8 mW
LOAD: 6 mA, 9 pF

DELAY: $t_w$ = 25 ns
POWER: 13.9 mW
LOAD: 2.5 mA, 4 pF

READ ONLY MEMORY AND DECODE CIRCUIT

CROSS REFERENCE TO RELATED APPLICATIONS

This application and the following concurrently filed, commonly assigned applications are directed to related inventions:

Monir El-Diwany and Hemraj K. Hingarh, "BUS AND POWER DISTRIBUTION STRUCTURES AND LATCH CELL FOR MICROPROCESSOR INTEGRATED CIRCUIT" Ser No. 530,990 filed Sept. 12, 1983;

Edward Hui and Hemraj K. Hingarh, "LATCH ENABLE TIMING UNIT AND D-FLIP-FLOP FOR MICROPROCESSOR INTEGRATED CIRCUIT", application Ser. No. 530,995 filed Sept. 12, 1983;

Monir El-Diwany, Edward Hui, Richard Pang and Hemraj K. Hingarh, "MICROPROCESSOR INTEGRATED CIRCUIT", application Ser. No. 530,997 filed Sept. 12, 1983.

This application also relates to an implementation of portions of the microprocessor system architecture described in the following earlier filed, commonly assigned applications:

Yeshayahu Mor et al., "CODE SHARED MICROPROCESSOR", Ser. No. 468,511, filed March 28, 1983;

Yeshayahu Mor, "MODIFIED BOOTH ALGORITHM MICROPROCESSOR", Ser. No. 468,450, filed March 23, 1983;

Michael G. Mladejovsky, "CONSTANTS GENERATION MICROPROCESSOR", Ser. No. 468,449, filed Feb. 22, 1983;

Nabil Damouny, "MICROPROCESSOR WITH DYNAMICALLY RECONFIGURABLE PIPELINE", Ser. No. 468,448, filed Mar. 23, 1983;

Yeshayahu Mor et al., "PIPELINED MICROPROCESSOR WITH INSTRUCTION RESTART", Ser. No. 468,445, filed Mar. 23, 1983;

Nabil Damouny et al., "MICROPROCESSOR WITH COMPACT MAPPED PROGRAMMABLE LOGIC ARRAY", Ser. No. 468,512, filed Mar. 29, 1983;

Nabil Damouny et al., "MICROPROCESSOR MULTIPROCESSING SYSTEM", Ser. No. 481,059, filed Mar. 31, 1983;

Dan Wilnai et al., "ARITHMETIC AND FLOATING POINT MICROPROCESSOR", Ser. No. 481,060, filed Mar. 31, 1983;

Nabil Damouny et al., "MICROPROCESSOR WITH BRANCH CONTROL", Ser. No. 481,061, filed Mar. 31, 1983; and Yeshayahu Mor et al., "MICROPROCESSOR INTERRUPT SYSTEM", Ser. No. 481,062, filed Mar. 31, 1983.

BACKGROUND OF THE INVENTION

1. Field of the Invention.

This invention relates to an improved implementation of a microprocessor integrated circuit design. In part, the microprocessor integrated circuit design concerns circuit implementations that give improved microprocessor performance and functionality. In part, the invention also relates to improved integrated circuit structure configurations. In particular, the invention relates to an improved data path multiplexing arrangement and busing structure. It further relates to a special ground balancing scheme that improves integrated circuit performance. The invention also relates to an improved register file storage circuit. The invention further relates to improved timing circuits for a microprocessor integrated circuit and related applications. It further relates to improved read only memory (ROM) circuits.

2. Description of the Prior Art.

A wide variety of integrated circuit microprocessors are now known in the prior art. All of the major semiconductor manufacturers in the United States offer such integrated circuits implemented in complementary metal oxide (CMOS) form or in bipolar integrated circuit form, whether in integrated injection logic ($I^2L$) or combined $I^2L$ and transistor-transistor logic (TTL) form. For example, the commercially available F9445 Microprocessor Integrated Circuit, available from the assignee of this application, is a high performance combined $I^2L$ and TTL integrated circuit. A further description of that integrated circuit is contained in the following copending, commonly assigned applications: Application Ser. No. 167,614 now Pat. No. 4,396,980 by Hemraj K. Hingarh, entitled "COMBINED INTEGRATED INJECTION LOGIC AND TRANSISTOR-TRANSISTOR LOGIC MICROPROCESSOR INTEGRATED CIRCUIT DESIGN", filed July 11, 1980, and Application Ser. No. 167,607 by Michael G. Mladejovsky, entitled "CYCLE COUNTER FOR MICROPROCESSOR INTEGRATED CIRCUIT", filed July 11, 1980. While the art pertaining to the design of microprocessor integrated circuits is therefore a well developed one, a need still remains for further improvements in such design in order to achieve greater levels of functionality and performance in high performance microprocessors.

SUMMARY OF THE INVENTION

Accordingly, it is an object of this invention to provide an improved form of data path multiplexing and busing structure.

It is a further object of the invention to provide an $I^2L$ integrated circuit having proper biasing conditions across the whole circuit with an injection bus of reduced width.

It is still another object of the invention to provide an improved register file cell design for a microprocessor integrated circuit It is still another object of the invention to provide an improved timing circuit for a register file cell in accordance with the invention.

It is yet another object of this invention to provide an organization for a ROM which allows efficient layout of the ROM in a microprocessor integrated circuit.

It is another object of the invention to provide such a ROM organization which allows rapid accessing of microcode stored in the ROM.

A microprocessor integrated circuit in accordance with this invention has a register file with a first plurality of registers. Each of the first plurality of registers is connected to one of a second plurality of local busses. The local busses are connected to a main bus by a multiplexing means.

In accordance with a further aspect of the invention, the microprocessor integrated circuit has a main injector bus and a ground return bus in a data path. There is at least one branch ground bus. A ground balancing resistor connects the ground return bus and the branch ground bus.

In yet another aspect of the invention, a memory storage circuit has a latch with a pair of outputs. There is a data input to the latch and an enable signal input to control the data input to the latch. The storage circuit includes a pair of output enable signal inputs, each of which is connected to control one of the pair of outputs.

In still another aspect of the invention, a timing circuit has a delay means connected to receive input timing pulses generated in response to a plurality of inputs. An output of the delay means is connected to supply delayed timing pulses to an output gate. The output gate is also connected to receive the input timing pulses. The output of the output gate is utilized, for example, as a latch enable timing circuit by the latch memory cell of this invention.

In a still further aspect of the invention, a D-type flip flop circuit used in the microprocessor integrated circuit of this invention has a master section and a slave section. Entry of data from a D input to the master section is controlled by a clock input. Clear and preset inputs independent of the clock input serve to set a desired state for the flip flop for a pair of outputs from the flip flop from any previous state.

In another aspect of the invention, the microprocessor integrated circuit has a ROM with a first plurality of X and Y addressible memory locations, arranged in words, bits and pages. The X direction addresses one of a second plurality of words on each page. The Y direction addresses one of a third plurality of pages and one of a fourth plurality of bits.

In accordance with another aspect of the invention, a decode circuit especially adapted for use with the ROM has a plurality of multiple emitter page selection transistors. One of the multiple emitters of each page selection transistor is connected to supply an output from the decode circuit. Another of the multiple emitters of each page selection transistor is connected to a base of its transistor and to receive a reference potential.

Provision of these features in a microprocessor integrated circuit gives enhanced performance to the circuit. While any one or any combination of these features in accordance with the invention will produce a performance improvement, one embodiment of the invention incorporates all of the features in a single microprocessor integrated circuit.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figures 1, 1A:
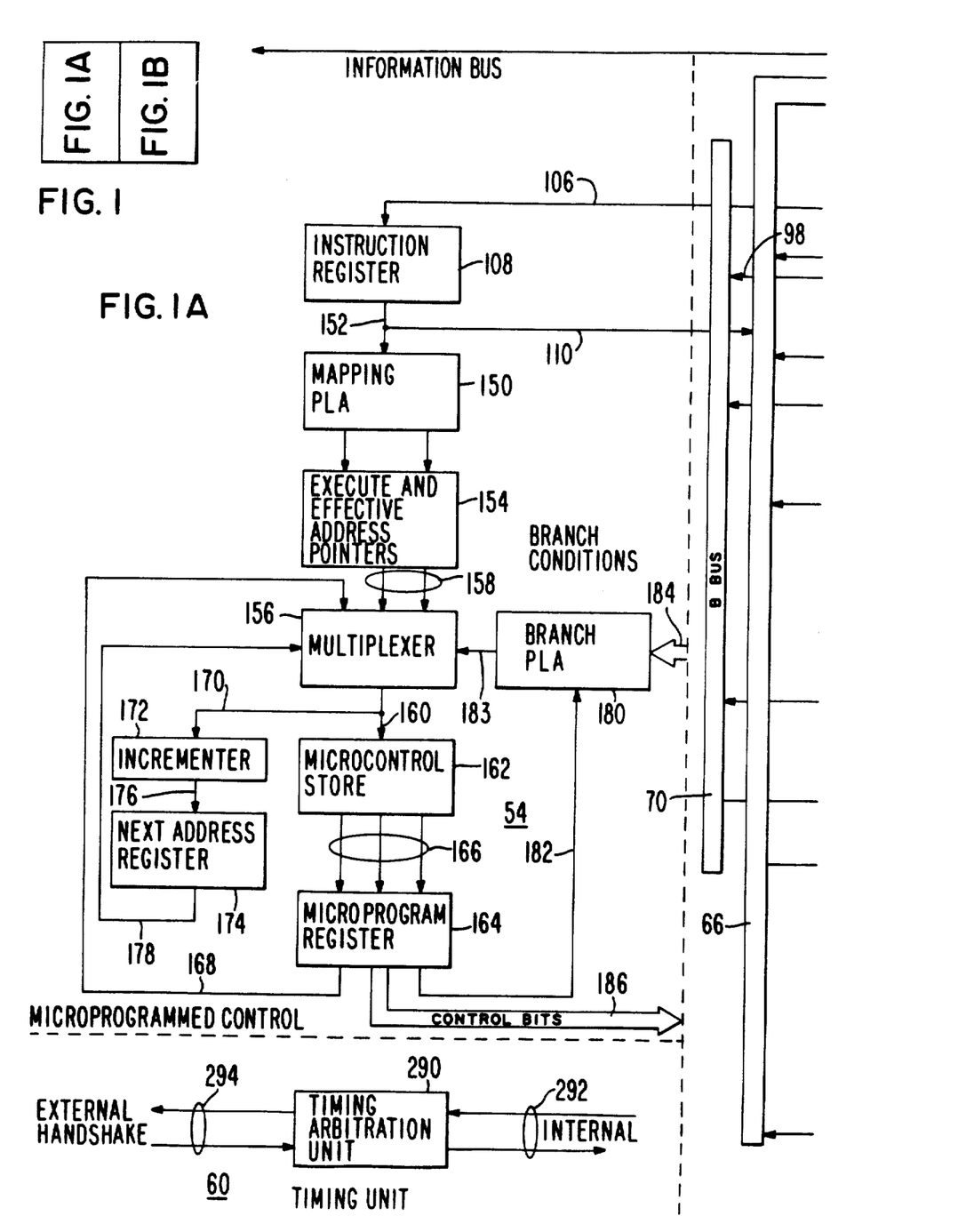
FIG. 1 is a key showing placement of FIGS. 1A and 1B.
FIGS. 1A and 1B are a generalized block diagram of a microprocessor integrated circuit which uses the present invention.
Figure 1B:
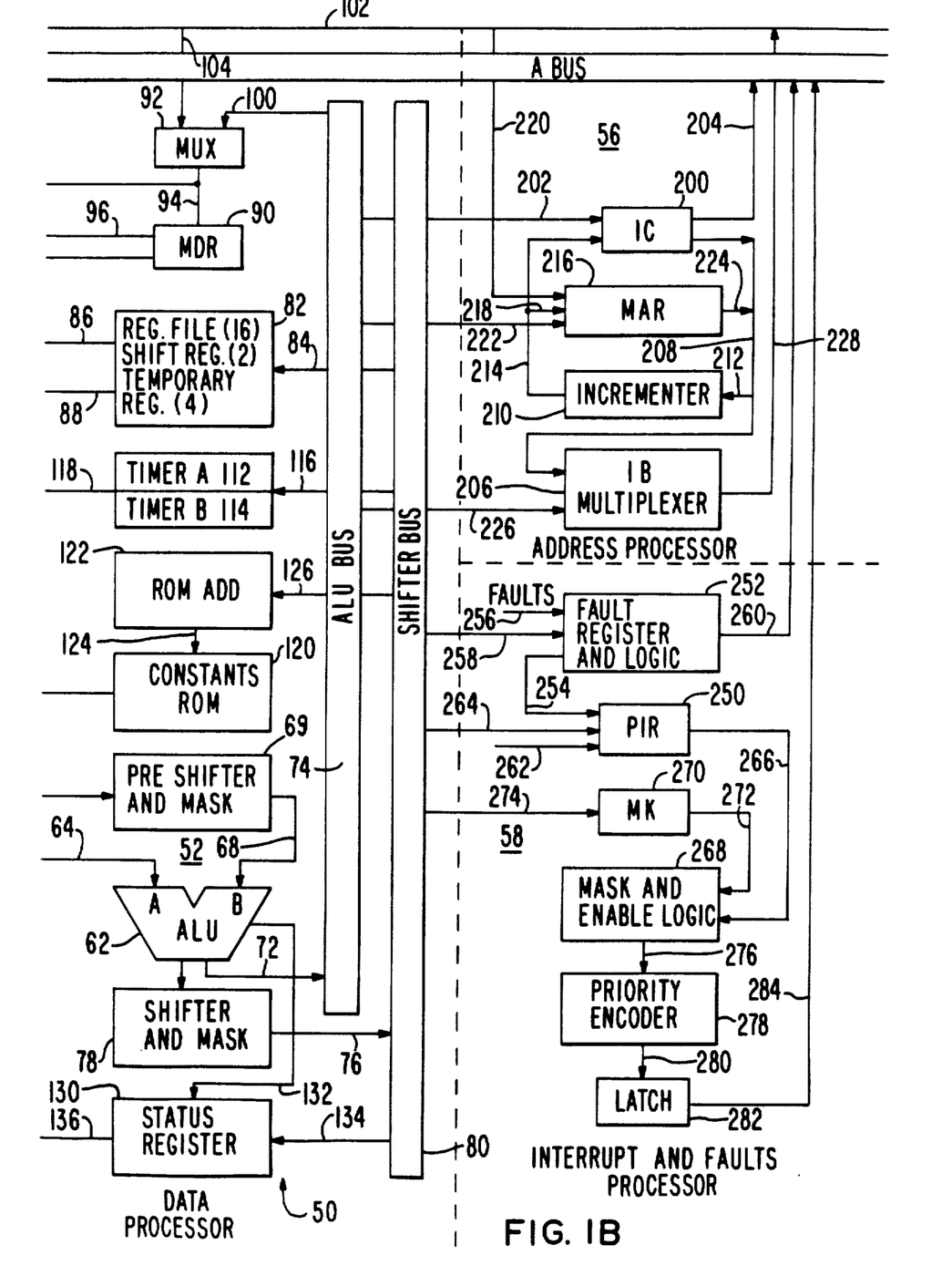

Turning now to the drawings, more particularly to FIGS. 1A and 1B, there is shown a microprocessor integrated circuit 50 in accordance with the invention. The microprocessor 50 consists of five main sections: a data processor 52, a microprogrammed control 54, an address processor 56, an interrupt and fault processor 58, and a timing unit 60.

The 16 bit wide data processor section 52 is responsible for all data processing in the microprocessor 50. The data processor 52 includes the functional blocks discussed below. A 17 bit arithmetic logic unit (ALU) 62 receives inputs at 64 from an A input bus 66, and at 68, through a preshifter and mask 69, from B input bus 70. Outputs from the ALU 62 are supplied at 72 to an ALU bus 74, and at 76, through shifter and mask 78, to a shifter bus 80. Register file 82 contains 16 general purpose registers $R_0$–$R_{15}$ and six working registers. The register file 82 receives inputs from ALU bus 74 at 84 and provides inputs to the A input bus 66 and the B input bus 70 at 86 and 88, respectively. A memory data register 90 receives inputs from multiplexer 92 at 94 and supplies inputs to the A input bus 66 and the B input bus 70 at 96 and 98, respectively. The multiplexer 92 receives inputs from the ALU bus 74 at 100 and from the information bus 102 at 104. The multiplexer 92 also supplies inputs at 106 to instruction register 108 in the microprogrammed control section 54. The instruction register 108 provides inputs at 110 to the A input bus 66. Two timers 112 and 114 receive inputs from shifter bus 80 at 116 and provide inputs at 118 to the A input bus 66. A constants ROM 120 receives ROM addresses from ROM address register 122 at 124. The ROM address register 122 receives inputs from the shifter bus at 126. A status register 130 receives inputs from the ALU 62 at 132 and from the shifter bus 80 at 134. The status register 130 provides inputs to A input bus 66 at 136.

The instruction register 108 in microprogrammed control section 54 provides new instructions fetched into the instruction register 108 to the mapping PLA 150 at 158. The multiplexer 156 provides inputs at 160 to the microcontrol store 162, which contains the execution and the effective address routines. The microcontrol store 162 generates three output fields to the microprogram register 164 at 166. The next address field supplied to microprogram register 164 is supplied at 168 to multiplexer 156. The multiplexer 156 also supplies inputs at 170 to incrementer 172. The incrementer 172 provides inputs to the next address register 174 at 176. The next address register 174 provides inputs at 178 to the multiplexer 156. The microprogram register 164 supplies the branch field output from microcontrol store 162 to a branch PLA 180 at 182. The branch PLA 180 provides inputs to the multiplexer 156 at 183. Branch conditions are supplied to the branch PLA 180 by the data processor section 52 at 184. The third output field from microcontrol store 162 supplied through the microprogram register 164 controls operation of all the components in the data processor 52 and is supplied to the data processor section 52 at 186.

The address processor section 56 includes an instruction counter (IC) 200, which receives inputs from the ALU bus 74 at 202. The IC 200 supplies instruction addresses to the A input bus 66 at 204. The IC 200 also supplies the instruction addresses to the information bus multiplexer 206 at 208, and to the incrementer 210 at 212. Outputs from the incrementer 210 are supplied to the IC 200 at 214, and to a memory address register (MAR) 216 at 218. Additional inputs to the MAR 216 are supplied by the information bus 102 at 220 and the ALU bus 74 at 222. The MAR 216 determines the addresses for all operands and supplies the address outputs at 224 to the incrementer 210 and the information bus multiplexer 206. An additional input to the information bus multiplexer is supplied by the ALU bus 74 at 226. The output of the information bus multiplexer 206 is supplied to the information bus 102 at 228. The incrementer 210 provides IC and operand address updates paralleling operation of the data processor section 52.

The interrupt and faults processor section 58 handles all interrupts and faults, whether generated internally or externally of the microprocessor 50. The interrupts and fault processor 58 has a pending interrupt register (PIR) 250. A fault register and logic (FT) 252 provides inputs to the PIR 250 at 254. Fault inputs are supplied to the FT 252 at 256, and from the shifter bus 80 at 258. Outputs from the FT 252 are also supplied to the A input bus 66 at 260. Additional interrupt inputs to the PIR 250 are supplied at 262, and from the shifter bus 80 at 264. Outputs from the PIR 250 are supplied at 266 to mask and interrupt enable logic 268. A mask register (MK) 270 provides inputs at 272 to mask and interrupt enabling logic 268. Inputs to the MK 270 are providing from shifter bus 80 at 274. The mask and interrupt enabling logic 268 provides outputs at 276 to a priority encoder 278. The priority encoder 278 provides outputs at 280 to a latch 282. The latch 282 provides outputs at 284 to the A input bus 66.

The timing unit 60 generates internal and external strobes required for internal operation of the microprocessor 50 and different bus transactions. Internal inputs are provided to and from a timing arbitration unit 290 at 292. Inputs external of the microprocessor 50 are provided to and from the timing arbitration unit 290 at 294.

Figures 2, 3:
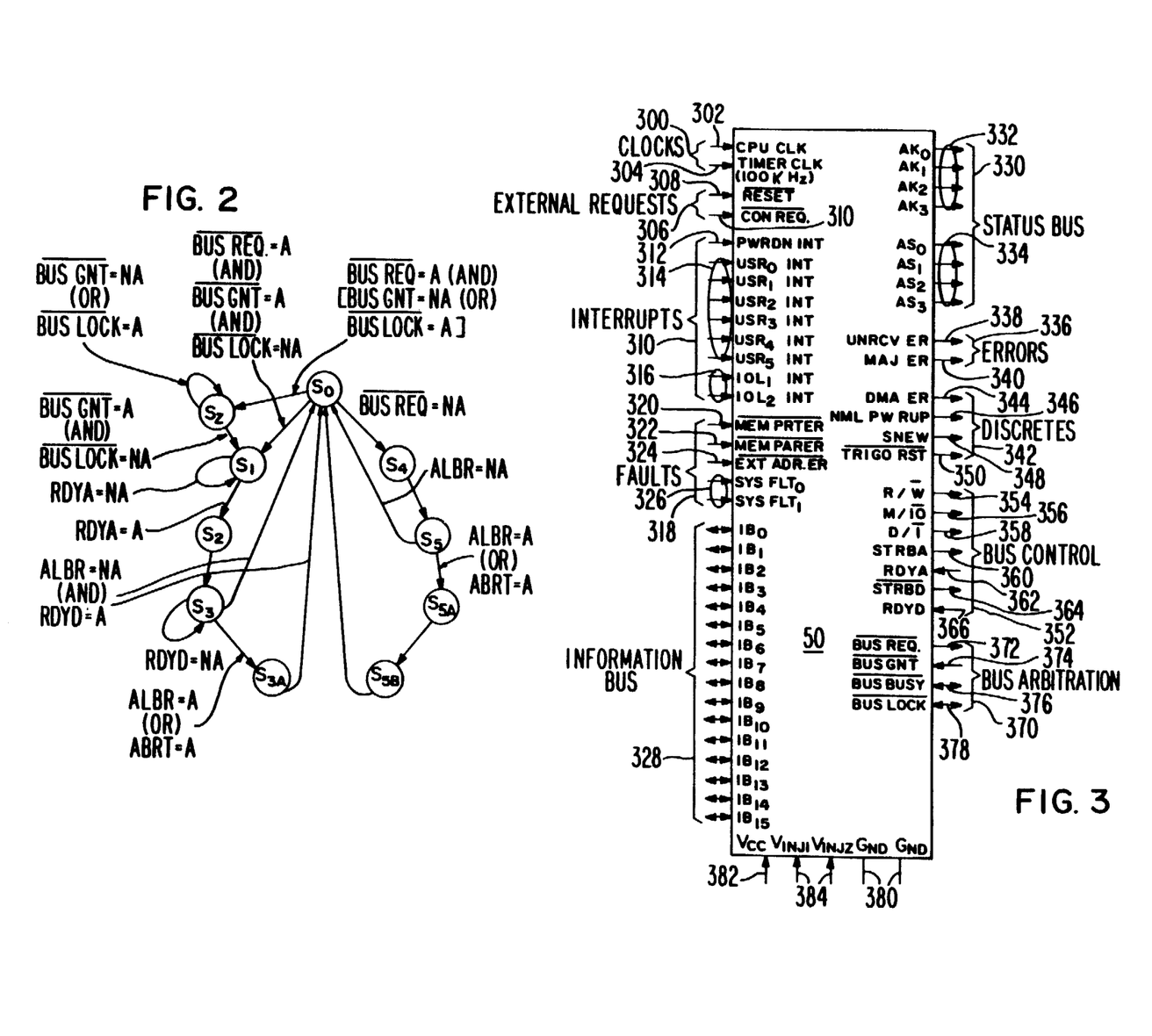
FIG. 2 is a timing generator state diagram for the microprocessor integrated circuit of FIGS. 1A and 1B.
FIG. 3 is an external view of the microprocessor integrated circuit of FIGS. 1A and 1B, showing external signals supplied to and from the microprocessor integrated circuit of FIGS. 1A and 1B.

A basic machine cycle for the microprocessor 50 may comprise 3, 4 or 5 CPU clock cycles or states as shown in the state diagram of FIG. 2. The legends used in FIG. 2 have the meanings shown below in Table 1.

A = Asserted (active)
NA = Not Asserted
ALBR = ALU Branch cycle (5 states) -internal signal
ABRT = Abort condition - internal signal
BUS REQ = Bus Request
BUS GNT = Bus Grant input
BUS LOCK = Bus Lock
RDYA = RDYA input
RDYD = RDYD input
$S_z$ = High impedance state - CPU drivers are 3-state A three-state cycle, consisting of states $S_0$, $S_4$ and $S_5$ is used for operations purely internal to the ALU 62. A four-state cycle consisting of states $S_0$, $S_1$, $S_2$ and $S_3$ is used for minimum length operations utilizing one of the buses. A five-state cycle, consisting of states $S_0$, $S_1$, $S_2$, $S_3$ and $S_{3A}$ or $S_0$, $S_4$, $S_5$, $S_{5A}$ and $S_{5B}$ applies for those operations that use the result of a current operation of ALU 62 to determine the next address in the microprogrammed control store 162. The five-state cycle also applies to those operations following an abort condition. Every timing cycle starts with states $S_0$, in which the timing unit 60 receives the control information needed to initiate a bus cycle or an internal ALU cycle.

A bus cycle can be extended by manipulating BUS GNT, RDYA or RDYD external inputs. These signals hold the microprocessor 50 in high impedance state $S_z$ when the bus 102 is assigned to another microprocessor 50 or direct memory access (DMA) device, state $S_1$, the address phase, or state $S_3$, the data phase, respectively, as shown in FIG. 2.

FIG. 3 shows the external inputs to and from the microprocessor 50. The clock inputs 300 to the microprocessor 50 include a 0-20 MHz CPU CLK signal at 302 and a 100 kHz timer CLK signal at 304. External requests 306 include a RESET signal at 308, which initializes the microprocessor 50 in its active low state, and a CONREQ signal, which initiates console operations after the current instruction being executed by the microprocessor 50, in its active low state.

A total of nine interrupt inputs 310 are provided to the microprocessor 50. A PWRDN INT signal 312, for a power down interrupt, is active on its positive going edge or its high level, according to the interrupt mode bit in the configuration register. $USR_0$ INT through $USR_5$ INT signals at 314 are user interrupts, active on the positive going edge or high level, according to the interrupt mode bit in the configuration register. The $IOL_1$ INT and $IOL_2$ INT signals at 316 are input/output level interrupts, which are active high inputs that can be used to expand the number of user interrupts.

Faults inputs are provided to the microprocessor 50 at 318. The MEM PRT ER signal at 320 represents a memory protect error and is an active low input generated by an external memory management unit (MMU) and/or an external block protect unit (BPU). It is sampled by BUS BUSY signal described below into bit 0 of fault register 252 in a CPU bus cyle, or bit 1 if a non-CPU bus cycle. A MEM PAR ER signal at 322 represents a memory parity error and is an active low input sampled by the BUS BUSY signal into bit 2 of the fault register 252. A EX ADR ER signal 324 represents an external address error and is an active low input sampled by the BUS BUSY signal into bit 5 or bit 8 of the fault register 252. $SYSFLT_0$ and $SYSFLT_1$ signals at 326 represent system faults and are active on the positive going edge to set bit 7 or bits 13 and 14, respectively, in the fault register 252.

The $IB_0$ through $IB_{15}$ information bus input and output signals at 328 represent active bi-directional, time multiplexed, address and data information on the 16 bit information bus 102. The bus 102 is three-stated during bus cycles not assigned to the microprocessor 50. The $IB_0$ signals is the most significant bit.

Status bus outputs from the microprocessor 50 are provided at 330. The AK0 through AK3 address key signals at 332 are active high outputs used to match with an access lock in an external MMU for memory accesses. A mismatch is one of several possible situations causing the MMU to pull the $\overline{\text{MEM PRT ER}}$ signal at 320 to its active low state. AS0 through AS3 address state signals at 334 are active high outputs which select the page register group in the external MMU.

Error outputs are provided at 336. A UNRCV ER unrecoverable error signal at 338 is an active high output indicating the occurrence of an error classified as unrecoverable. The instruction in which the error occurred is aborted. The MAJ ER major error signal at 340 is an active high output indicating the occurrence of an error classifed as major. The instruction in which the error occurred is also aborted.

Discrete outputs from the microprocessor 50 are provided at 342. The DMA EN direct memory access enable signal at 344 is active high and indicates that DMA is enabled. DMA is disabled when the external request $\overline{\text{RESET}}$ signal at 346 is active high and indicates when the microprocessor 50 has completed its built in test in an initialization sequence successfully. The SNEW start new signal at 348 is active high and indicates that a new instruction will start executing in the next cycle. This information is useful for instruction tracing. The TRIGO RST trigger go reset signal at 350 is an active low discrete output.

Bus control inputs and outputs to and from the microprocessor 50 are provided at 352. The $R/\overline{W}$ read or write output signal at 354 indicates the direction of data flow. A high signal indicates a read or input operation and a low signal indicates a write or output operation. The output at 354 is three-stated during bus cycles not assigned to the microprocessor 50. The $M/\overline{IO}$ memory or I/0 output signal at 356 indicates whether a current bus cycle is a memory (high) or I/0 operation (low). The output 356 is three-stated during bus cycles not assigned to the microprocessor 50. A $D/\overline{I}$ data or instruction output signal at 358 indicates a current bus cycle access is for data if high or for instruction if low. The output 358 is three-stated during bus cycles not assigned to the microprocessor 50. The STRBA address strobe signal at 360 is used for latching the memory or XIO address in its active high output in an external latch at the high to low transition of strobe. The output 360 is three-stated during bus cycles not assigned to the microprocessor 50. The RDYA address ready signal is supplied at 362 and is an active high input used to extend the address phase of a bus cycle. The $\overline{\text{STRBD}}$ data strobe signal at 364 is an active low output used for strobing data in memory and XIO cycles. The output at 364 is three-stated during bus cycles not assigned to the microprocessor 50. The RDYD data ready signal at 366 is an active high input used to extend the data phase of a bus cycle. Wait states are inserted as long as RDYD is not active to accommodate slower memory devices.

Bus arbitration inputs and outputs are supplied to and from the microprocessor 50 at 370. The BUS REQ output signal at 372 is an active low output indicating that the microprocessor 50 requires the bus. This signal becomes inactive as soon as the microprocessor 50 has acquired the bus and started the bus cycle. The BUS GNT signal supplied at 374 from an external arbiter is an active low input which indicates that the microprocessor 50 currently has the priority bus request. If the bus is not locked, the microprocessor 50 may begin a bus cycle commencing with the next CPU clock. The BUS BUSY signal at 376 is an active low bi-directional signal used to establish the beginning and end of a bus cycle. The trailing edge low to high transition is used for sampling bits into the fault register 252. This signal is three-stated in bus cycles not assigned to the microprocessor 50. However, the microprocessor 50 monitors the BUS BUSY line 376 for latching other than microprocessor 50 bus cycle faults into the fault register 252. The BUS LOCK signal at 378 is an active low, bi-directional signal used to lock the bus for successive bus cycles. During non-locked bus cycles, BUS LOCK mimics BUS BUSY. BUS LOCK is three-stated during bus cycles not assigned to the microprocessor 50.

Lines 380 of the microprocessor are grounded. Line 382 supplies a $V_{cc}$, nominally +5V, 225 mA, input to the microprocessor 50. Lines 384 supply a $V_{INJ1}$ and $V_{INJ2}$ input, nominally +1.3V, 1.4A, to the microprocessor 50.

Further details on the system and operation of the microprocessor integrated circuit 50 are contained in the above referenced earlier filed related applications, the disclosures of which are incorporated by reference herein.

Figure 4:
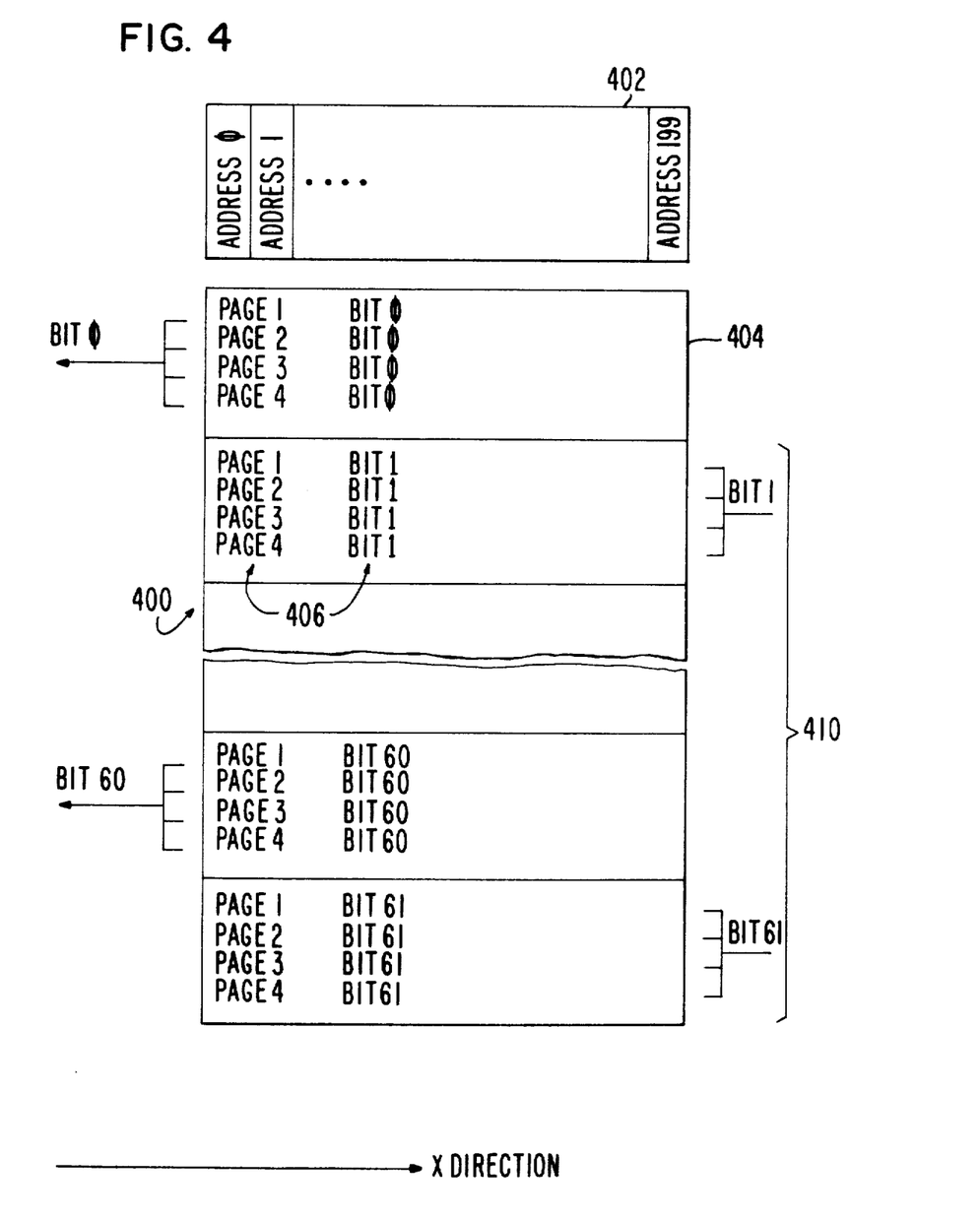
FIG. 4 is a block diagram of a ROM configured in accordance with the invention.

FIG. 4 is a block diagram of a ROM 400 to implement the microcontrol store 162 used in the invention. Address portion 402 contains column addresses in memory portion 404, which is page and bit oriented as shown at 406. The ROM is row addressed at 410. In the X direction, one of 200 words in each page is addressed, and Y addresses one of the four pages.

Figure 5:
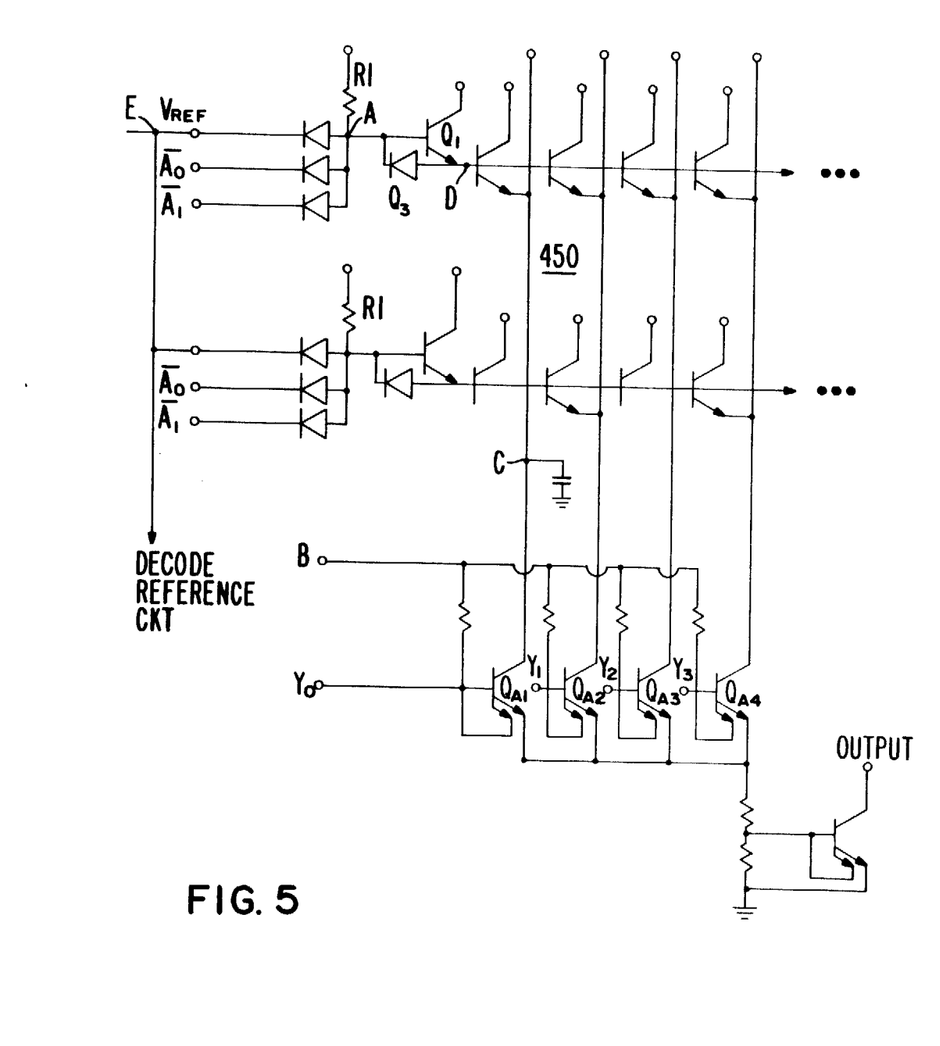
FIG. 5 is a circuit schematic of a ROM circuit utilized in the invention.

FIG. 5 shows a decode circuit 450 employed in accessing the ROM 400. For speed considerations, it is desired to limit the voltage on node C. Hence, Node A is set at $4V_{be}$ and node B at $3V_{be}$. Transistor Q1 charges up the high base capacitance node D, with diode Q3 for discharging. Transistors QA1, QA2, QA3, and QA4 are for selecting one of the four pages. In a preferred form of the circuit, Vcc is a minimum of 4.5 volts at start up and $4V_{be}$ at node A.

Figure 6:
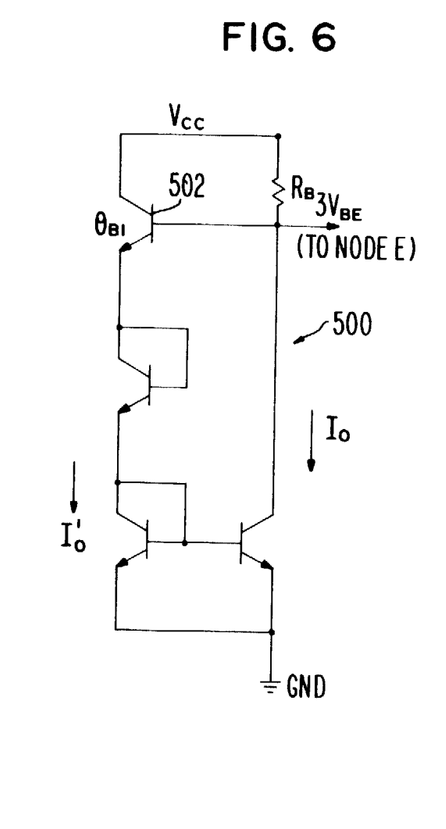
FIG. 6 is a circuit schematic of another ROM circuit utilized in the invention.

FIG. 6 shows a reference circuit 500 employed with the ROM 400 of FIG. 4. The reference circuit is important for speed of the ROM 400 by limiting the voltage swing on the high capacitance node C (FIG. 5). The reference circuit 500 also helps to limit custom resistors in each $x_i$ otherwise required because of the different loads, depending on how many emitter contacts are connected to each x line in the ROM. Only a constant resistor is required for each of 200 X addresses, shortening layout time for the ROM 400. Base 502 of transistor QB1 draws very little current, and I01' is essentially equal to I0.

Figure 7:
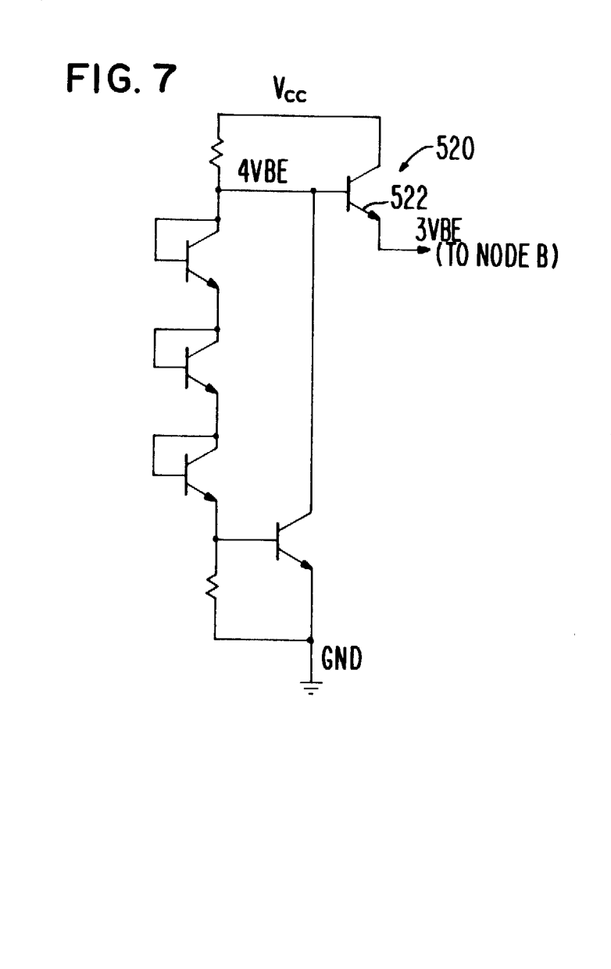
FIG. 7 is a circuit schematic of another ROM circuit utilized in the invention.

FIG. 7 shows reference circuit 520, which is connected to node B (FIG. 5). Emitter 522 is set at $3V_{be}$.

Due to high current requirements for the microprocessor integrated circuit 50, i.e., a total $I_{inj}$ of about 1.4A, careful control of voltage drops in both injection and ground busses 602 and 604, respectively, is important. In order to maintain proper biasing for all parts of the integrated circuit 50, a maximum voltage difference of 25 mV on all the I²L transistors $V_{BE}$ must be maintained over the operating temperature range of the the integrated circuit 50.

Figure 8:
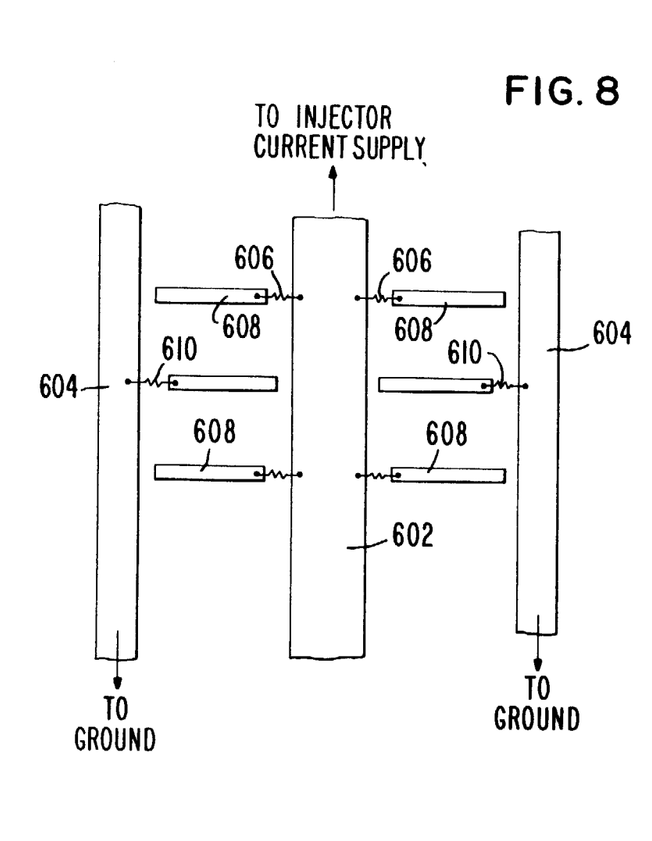
FIGS. 8 and 9 are plan views of bus structures used in the invention.
Figure 9:
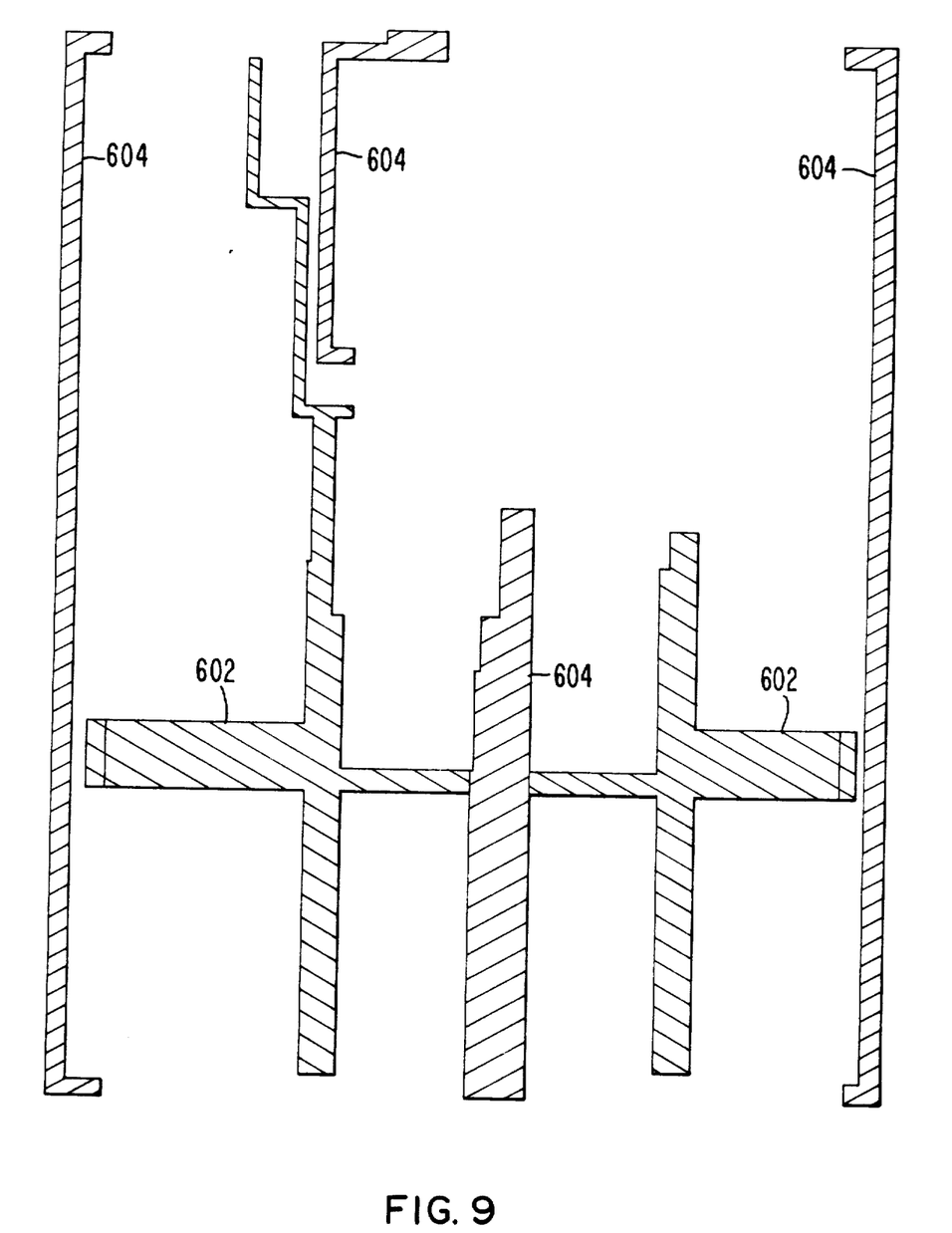

FIGS. 8 and 9 show details of I²L power distribution in the microprocessor integrated circuit. For the injector busses 602, voltage drops across the busses 602 is accounted for in the value of the drop off resistors 606 (FIG. 9). The value of the drop off resistor 606 will determine the current in the injector branch 608, which is set by the number of I²L transistors connected to that branch 608. For ground busses 604, normally the width of the ground busses 604 is increased, hence reducing ohmic voltage drop to approach a perfect ground, zero voltage everywhere. However, in order to achieve this result, the size of the busses 604 would be prohibitively large, due to the high currents involved.

In accordance with this invention, ground balancing is achieved to overcome this limitation. Rather than attempting to reduce the ground voltage to zero, the actual ground voltage is raised to some reference voltage value VGref through a ground balancing resistor 610. The voltage drop across the main ground busses 604 is therefore accounted for through the value of that resistor 610.

In order to maintain the chip 50 total power dissipation to a minimum, it is essential to maintain VGref as small as possible. The value of VGref is determined by essentially the maximum voltage drop VGMAX across the main ground bus 604 and the maximum voltage drop VGR across a ground balancing resistor closest to the point of VGMAX. The value of VGR in turn is determined by ground current Ig and the minimum achievable resistor value Rmin.

Figure 10:
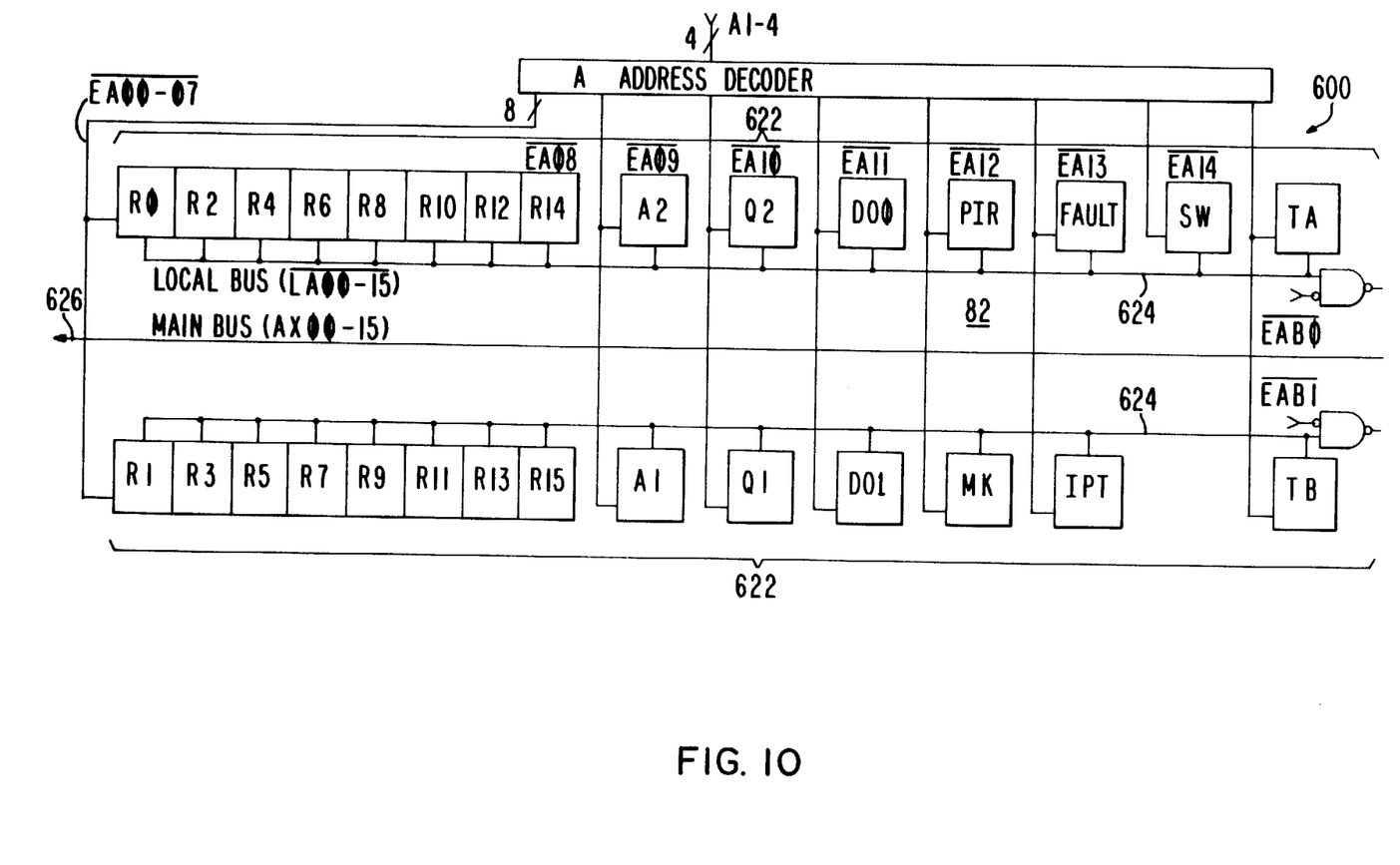
FIG. 10 is a block diagram of a register file data path bus structure used in the invention.

FIG. 10 shows the register file data path bus structure 600 forming a part of the invention. The busing structure shown in FIG. 10 is implemented in the microprocessor circuit 50 for its data path. The busing structure reflects a two-level addressing scheme, i.e., main address and local address. The main address determines the inputs to the ALU, e.g., register file, IR, MDR, IC, MAR, or the like. In the register file, a local address determines the particular register being selected. The addressing scheme is identical for the two inputs to the ALU (A and B busses). Operation of only one of these busses will therefore be explained.

A 5-bit address (1 of 32) is required for addressing the register file 82, 5 bits for the A address and 5 bits for the B address. Two pages each consist of up to 16 registers 622, addresssed in parallel using 4-bit addresses (1 of 16). Each page is connected to a separate local bus 624. The fifth address bit is combined with the register file 82 main address select signal in order to select, i.e., multiplex one of the two local busses 624 onto the main bus 626.

Fundamentally, this busing scheme reduces the total propagation delay. A simple bus structure may have all registers connected into a single local bus. The local bus will then have a total loading capacitance of a maximum of 32 collectors, in addition to wire capacitance. Using a two local bus 624 structure instead reduces the capacitance on each local bus by a factor of two. As a result, there is about an 8 nanosecond reduction in local bus access time. The simplified address decoder (1-of-16 instead of 1-of-32) reduces the propagation delay in an ALU cycle by one additional gate delay. Therefore the above described addressing scheme reduces the propagation delay in an ALU cycle by approximately 12 nanoseconds.

Some additional benefits in chip layout are obtained through use of the busing scheme. Each register requires three control signals, i.e., one clock signal (WRITE) and two out enable signals for dual port registers (READ). Using the two local bus scheme, two registers may share the same READ signals, but not WRITE signals, therefore reducing the number of control signals by a third. The number of control signals is particularly important in the chip layout, since it will determine the width of the data path. That saving in chip area offsets to a great extent the increase in area due to the additional local bus per bit.

Figure 11:
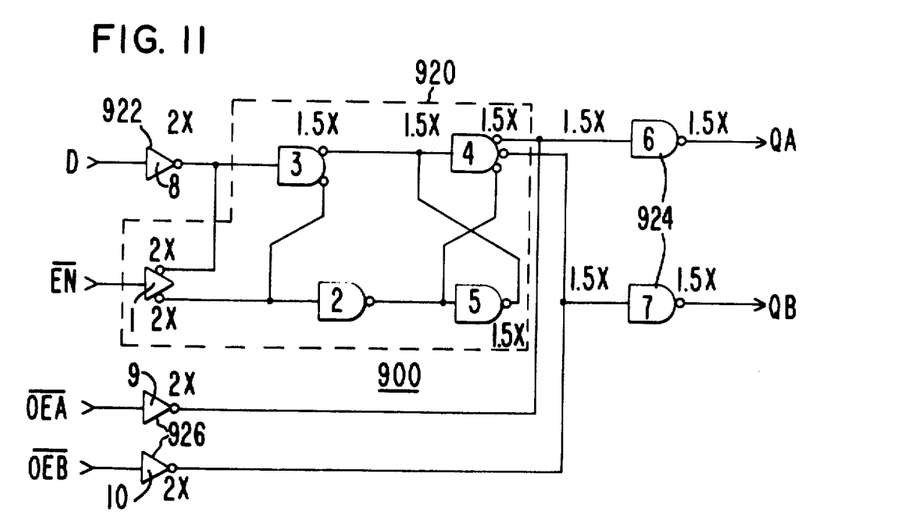
FIG. 11 is a logic diagram of a latch circuit used in the invention.

FIG. 11 shows an improved latch dual port random access memory (RAM) circuit 900 used in the register file 82 of the microprocessor integrated circuit 50. In place of the D-type flip flop normally used for this purpose, the circuit 900 provides a number of advantages. A dual port D-type flip flop requires 12 gates to implement, and the circuit 900 only requires 10 gates. In terms of the microprocessor integrated circuit 50 of this invention, the significance of this reduction in gates is shown by the fact that 25% of the I²L gates in the microprocessor integrated circuit 50 are in the register file. The two gate saving in each cell of the register file results in a 15% reduction in input power for each cell and a 10% reduction in cell area.

Implementing the register file cells with latches required solving a timing problem and a problem with glitches in the latch output signal. The timing problem arises from the fact that data input to the register file is shared by other registers on a common input data bus. These other registers are implemented in D-type flip flop form, and they are edge triggered. It is therefore necessary to generate a special latch enable signal EN from the main clock pulse used in edge triggering the D-flip flops of the other registers. The pulse width of the EN signal is adjusted so that only the proper data input is latched into a cell 900. The EN signal is generated from the circuits shown in FIGS. 16 and 17, as explained above. .

Corrective action was also required in order to avoid a glitch in the latch output signals QA and QB following the leading edge of the EN signal. Since the output enable signal OEA or OEB reaches the register file from the address decoder later in the cycle after the data has been latched into the register file, no glitches will appear on the register file output busses.

The dual port latch cell 900 shown in FIG. 11 consists of a basic latch cell 920, comprising gates 1-5, with an input buffer 922, consisting of gate 8, and two output gates 924, consisting of gates 6 and 7. There are also output enable buffers 926, consisting of gates 9 and 10. If desired, the output gates 924 can be connected to gate 5 to change the polarity of the output signals QA and QB.

In operation, as the latch enable signal EN becomes assertive, (active low), the latch 920 becomes transparent and the input data D are latched on gates 4 and 5. The latch outputs 924 remain open circuit as long as the output enable signals OEA and OEB are non-assertive. The latch enable signal EN may now be turned non-assertive, and the latch 920 becomes non-transparent. The output enable signals OEA and OEB may become assertive (active low) at any time and the latched data on gates 4 and 5 are transferred to QA and QB outputs, independently of one another. During the WRITE operation, a glitch may appear at the output of gate 4. That glitch will not appear at the QA and QB outputs if the READ operation is allowed to lag behind WRITE operations by more than two gate delays.

Figure 12:
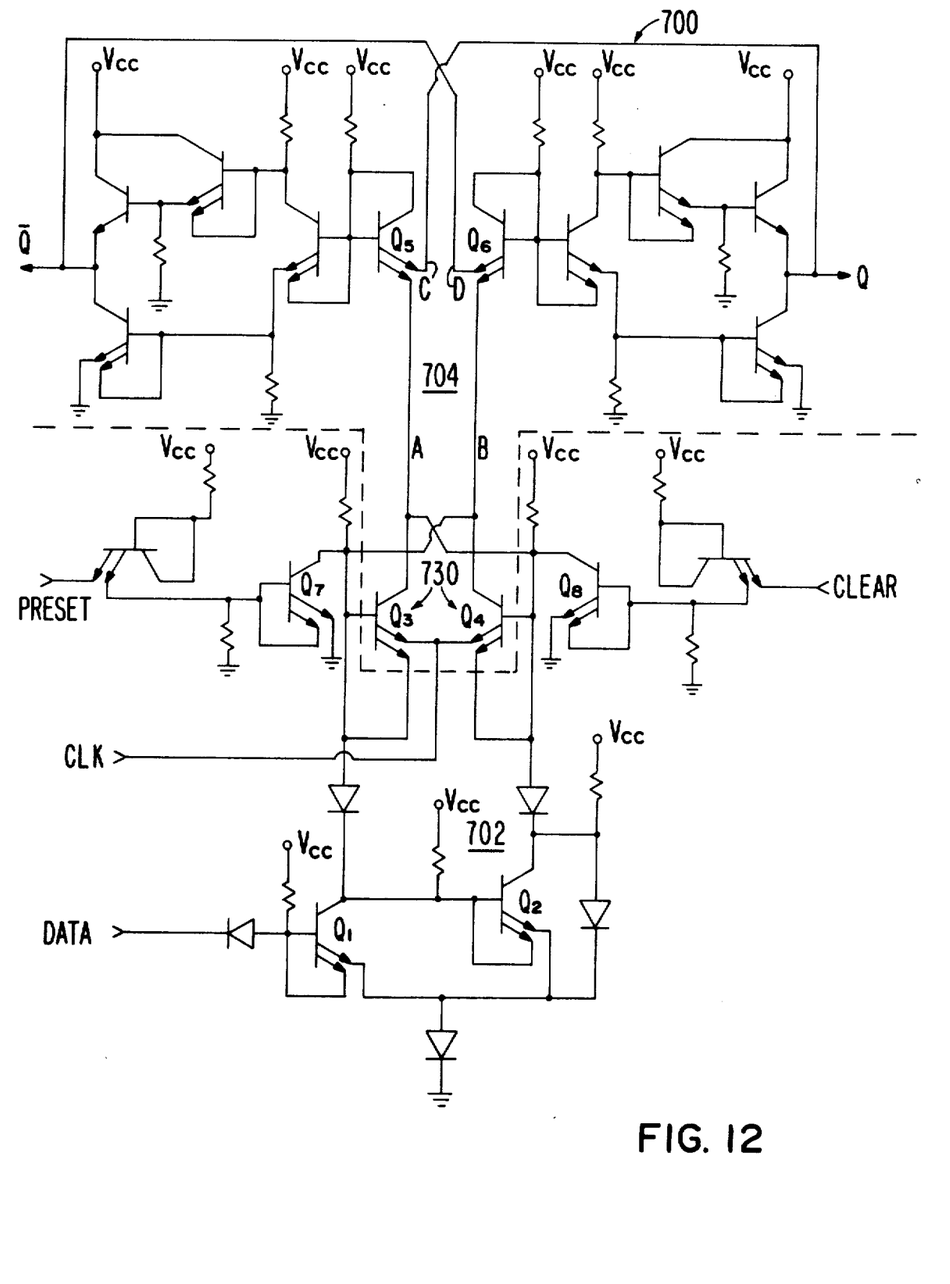
FIG. 12 is a circuit schematic of a flip-flop circuit used in the invention.
Figure 13:
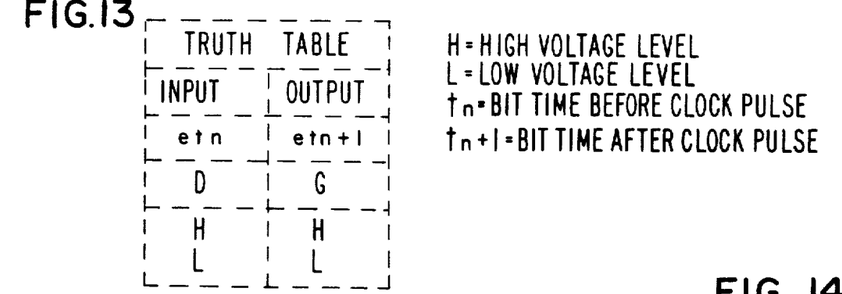
FIG. 13 is a truth table useful for understanding the circuit schematic of FIG. 12.
Figure 14:
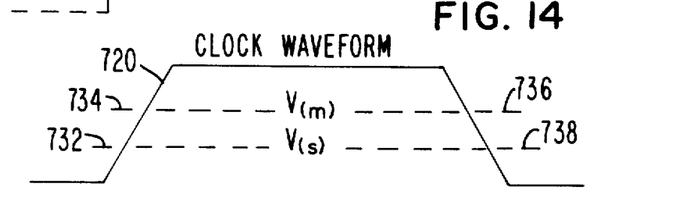
FIGS. 14, 15 and 16 are waveform diagrams also useful for understanding operation of the circuit in FIG. 11.
Figure 15:
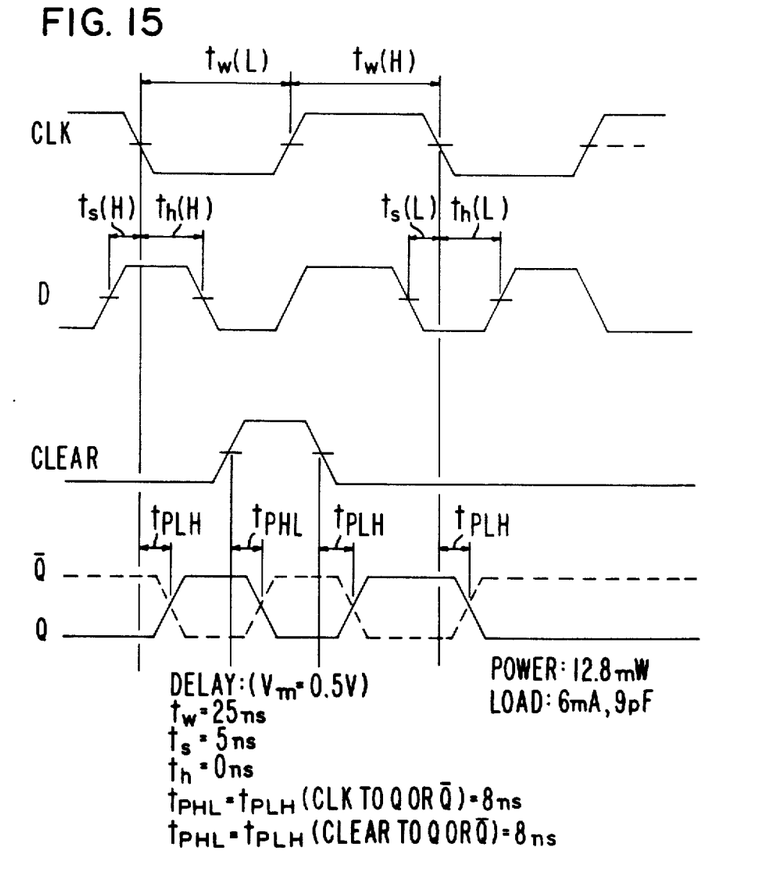
Figure 16:
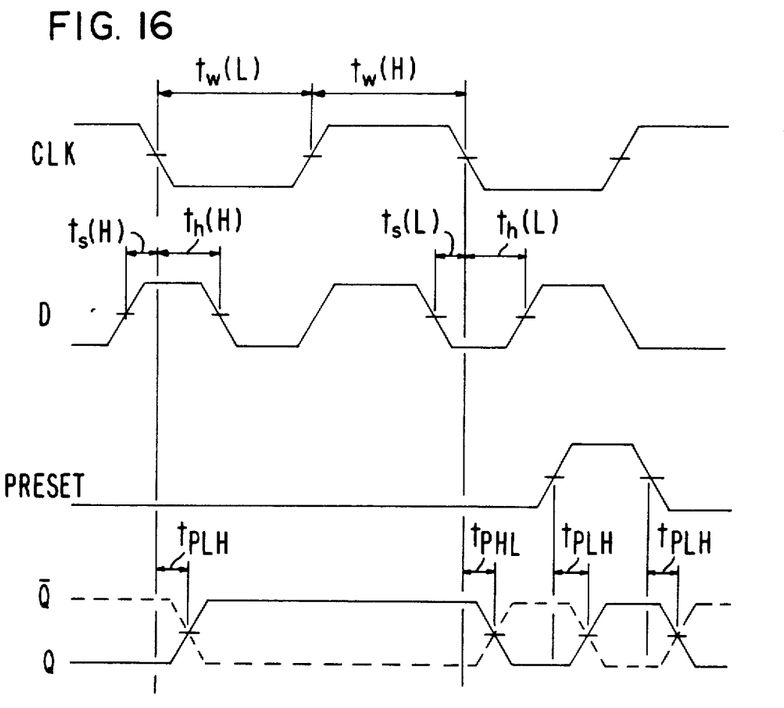

FIG. 12 shows a D-type flip flop circuit 700 with asynchronous clear and preset in accordance with the invention. FIG. 13 is a truth table for the circuit 700. FIGS. 14–16 are waveform diagrams useful for understanding operation of the circuit 700. The flip flop 700 has a master section 702 and a slave section 704. The outputs of the master section 702 are at nodes A and B. The inputs of the slave section are at nodes A, B, C and D. The CLK clock input signal controls both the master and slave sections 702 and 704.

Operation of the circuit 700 will now be explained, with reference to FIGS. 13–16. When the V(clk) waveform 720 (FIG. 14) is less than V(m), the minimum master loading voltage, the outputs of the master section 702 are fixed regardless of any change in the inputs at node D. Therefore, nodes A and B can only be changed when waveform 720 is greater than V(m).

When waveform 720 is greater than V(s), the maximum slave loading voltage, the inputs of the slave section 704 at nodes C and D assume control, independently of the state of nodes A and B. Therefore, outputs from the master section 702 can be loaded to slave section 704 only when waveform 720 is less than V(s).

Since the circuit 700 is negative edge triggered, V(m) is always larger than V(s). Inputs to the master section are controlled by the clock pulse 720. The clock pulse 720 also regulates the state of the coupling transistors 730 which connect the master and slave sections 702 and 704. The sequence of operation is as follows: at point 732, isolate slave 704 from master 702; at point 734, enter information from D input to master section 702; at point 736, disable D input; at point 738, transfer information from master section 702 to slave section 704.

For asynchronous clear and reset, asynchronous inputs are as follows: HIGH input to CLEAR sets Q to LOW level; HIGH input to PRESET sets Q to HIGH level; simultaneous HIGH on CLEAR and PRESET makes both outputs HIGH. Also, the asynchronous CLEAR and PRESET inputs will force the flip flop 700 into a fixed state, regardless of previous state, independently of clock waveform 720. The CLEAR and PRESET inputs are designed to reduce current hogging, even if a series of CLEAR and PRESET inputs are tied together.

Figure 17:
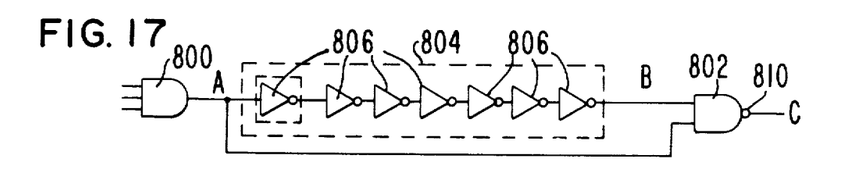
FIG. 17 is a logic diagram of a timing circuit used in the invention.
Figure 18:
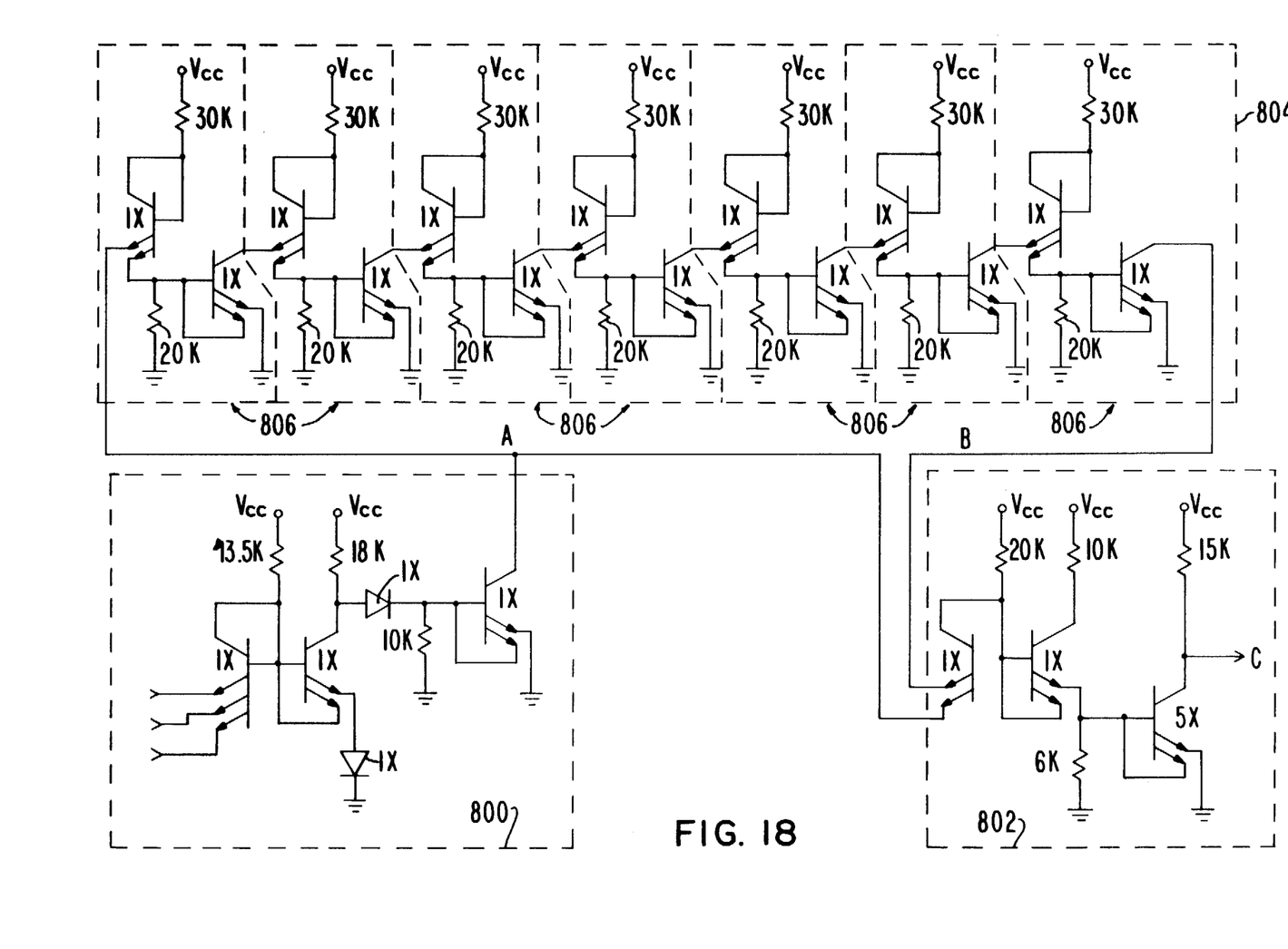
FIG. 18 is a circuit schematic of the timing circuit in FIG. 17.
Figure 19:
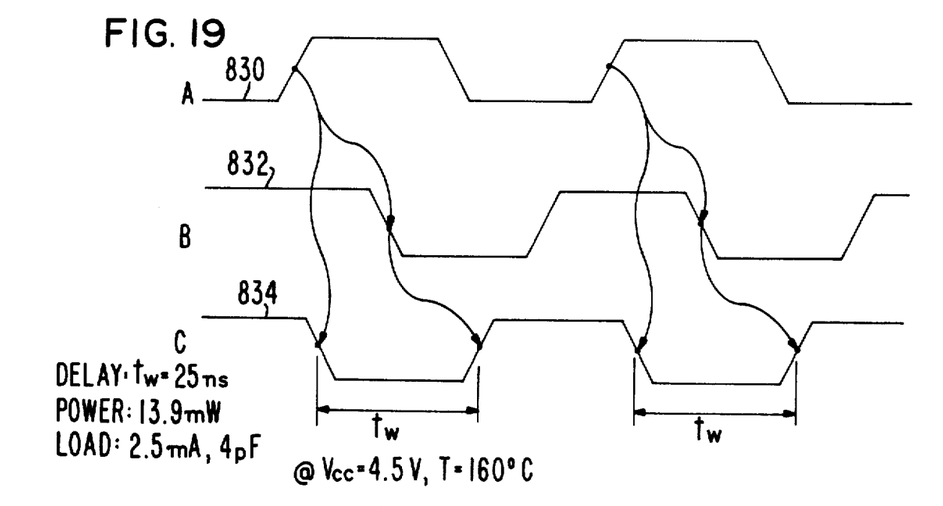
FIG. 19 is a waveform diagram useful for understanding the logic diagram of FIG. 17.

FIG. 17 shows a block diagram of circuits 800, 802 and 804, comprising a three input AND gate 800, a two input NAND gate 802 and a set 804 of inverters 806. FIG. 18 shows details of isoplanar I²L, i.e., I³L (trademark of Fairchild Camera and Instrument Corporation) latch enable circuits 800, 802 and 804. FIG. 19 shows waveforms 830, 832 and 834 used in the circuits 800, 802 and 804. The three inputs to AND gate 800 will generate a signal through the AND gate 800 at node A. The signal at node A is delayed by the inverters 806 to give a signal at node B. The NAND gate 802 utilizes the signals at nodes A and B to generate a negative going pulse 834 at its output 810. The width of this pulse 834 is controlled by the gate delays of the inverters 806. However, the polarity of the pulse 834 is determined by the output NAND gate 802.

Figures 20, 21:
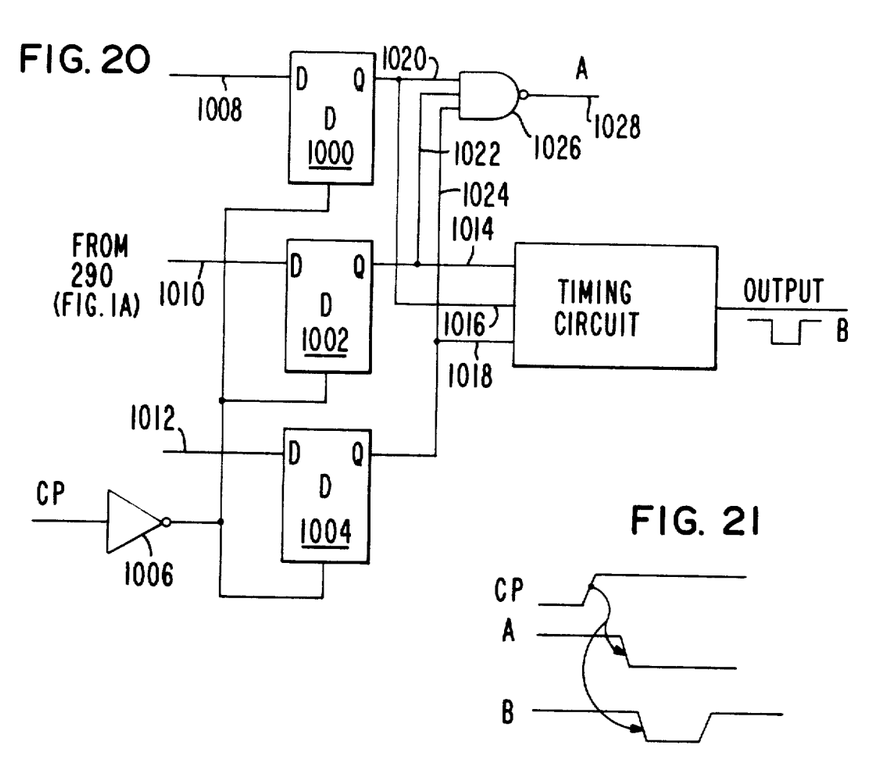
FIG. 20 is a logic and block diagram of a circuit generating inputs to the circuits of FIGS. 12, 17 and 18.
FIG. 21 is a waveform diagram useful for understanding operation of the circuit in FIG. 20.

FIGS. 20 and 21 provide further details on the generation of the three inputs to AND gate 800 in the latch enable timing circuits of FIG. 17. A clock pulse CP is supplied to D-flip flop circuits 1000, 1002 and 1004, through inverter amplifier 1006. System timing signals are provided to the D inputs of the flip flops 1000–1004 on lines 1008, 1010 and 1012. The Q outputs of flip flops 1000–1004 on lines 1014, 1016 and 1018 constitute the three inputs to AND gate 800. These Q outputs are also supplied on lines 1020, 1022 and 1024 to AND gate 1026. AND gate 1026 provides an additional set of A pulses on line 1028 for edge triggering the D-flip flop 700 (FIG. 12) also used in register file 82. FIG. 21 shows the timing relationship between the clock pulses CP and the A and B pulses.

It should now be readily apparent to those skilled in the art that a novel high performance microprocessor integrated circuit and improved circuits for incorporation in such a microprocessor integrated circuit capable of achieving the stated objects of the invention have been provided. The ROM organization of this invention allows both efficient layout in the integrated circuit 50 and rapid accessing of microcode stored in the ROM. Proper biasing conditions are maintained across the entire I²L integrated circuit 50 while providing an injection bus of reduced width. The data path multiplexing and busing structure of the integrated circuit 50 gives improved performance. The register file cell 900 design produces considerable saving in chip size and power requirements.

It should further be apparent to those skilled in the art that various changes in form and details of the invention as shown and described may be made. It is intended that such changes be included within the spirit and scope of the claims appended hereto.

What is claimed is:

1. A microprocessor integrated circuit including a read only memory, which comprises a first plurality of X and Y addressible memory locations arranged in words, bits and pages, the X direction accessing one of a second plurality of words on each page, the Y direction addressing one of a third plurality of pages and one of a fourth plurality of bits.

2. The microprocessor integrated circuit of claim 1 in which said read only memory has a decode circuit including a plurality of page selection transistors.

3. The microprocessor integrated circuit of claim 2 in which said decode circuit comprises programmable storage transistors.

4. The microprocessor integrated circuit of claim 3 in which said decode circuit includes a first reference circuit connected between a collector of one of said page selection transistors and an emitter of another of said emitter programmable transistors.

5. The microprocessor integrated circuit of claim 2 in which said page selection transistors are multiple emitter transistors, one emitted of which is connected to supply outputs from said decode circuit to an output transistor, a second emitter of which is connected to a base of its transistor and to a second reference circuit.

6. A decode circuit for a read only memory, which comprises a plurality of multiple emitter page selection transistors, one of the multiple emitters of each page selection transistor being connected to supply an output from said decode circuit, another of the multiple emitters of each page selection transistor being connected to a base of its transistor and to receive a reference potential.

* * * * *